United States Patent
Su et al.

(10) Patent No.: US 7,898,607 B2
(45) Date of Patent: Mar. 1, 2011

(54) LIQUID CRYSTAL DISPLAY AND DRIVING METHOD THEREOF

(75) Inventors: Jenn-Jia Su, Hsin-Chu (TW);
Ming-Feng Tien, Hsin-Chu (TW);
Ting-Jui Chang, Hsin-Chu (TW);
Po-Lun Chen, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 0 days.

(21) Appl. No.: 12/795,995

(22) Filed: Jun. 8, 2010

(65) Prior Publication Data
US 2010/0245696 A1    Sep. 30, 2010

Related U.S. Application Data

(63) Continuation of application No. 11/682,003, filed on Mar. 5, 2007, now Pat. No. 7,812,896.

(30) Foreign Application Priority Data

Sep. 8, 2006   (TW) ............................. 95133352 A (51) Int. Cl.
*G02F 1/1343* (2006.01)
(52) U.S. Cl. ............................. 349/38; 349/48; 349/144
(58) Field of Classification Search .................... None
See application file for complete search history.

(56) References Cited

U.S. PATENT DOCUMENTS

| | | | |
|---|---|---|---|
| 5,808,706 A | 9/1998 | Bae | |
| 5,923,310 A | 7/1999 | Kim | |
| 6,680,722 B1 | 1/2004 | Hiraki et al. | |
| 6,958,791 B2 | 10/2005 | Shimoshikiryo | |
| 7,429,981 B2 | 9/2008 | Shimoshikiryoh | |
| 7,812,896 B2 * | 10/2010 | Su et al. ........................ | 349/48 |
| 2003/0227429 A1 | 12/2003 | Shimoshikiryo | |
| 2004/0001167 A1 | 1/2004 | Takeuchi et al. | |
| 2005/0030460 A1 | 2/2005 | Kim et al. | |
| 2005/0122441 A1 | 6/2005 | Shimoshikiryoh | |
| 2005/0253797 A1 | 11/2005 | Kamada et al. | |
| 2006/0215066 A1 | 9/2006 | Ueda et al. | |
| 2007/0002194 A1 | 1/2007 | Shin | |
| 2007/0057297 A1 | 3/2007 | Kim | |
| 2008/0007506 A1 | 1/2008 | Chen et al. | |

FOREIGN PATENT DOCUMENTS

| | | |
|---|---|---|
| CN | 1764865 | 4/2006 |
| CN | 1800953 | 7/2006 |

(Continued)

*Primary Examiner*—Mike Stahl
(74) *Attorney, Agent, or Firm*—Thomas, Kayden, Horstemeyer & Risley (57) ABSTRACT

A liquid crystal display includes a gate driver, a data driver and a pixel matrix. The gate driver is for outputting a plurality of gate signals successively. The data driver is for providing a plurality of data signals. The pixel matrix includes a number of pixels. Each pixel includes a first sub-pixel, a second sub-pixel and a voltage coupling device. The voltage coupling device is coupled between the first sub-pixel and the second sub-pixel such that pixel voltages of the first sub-pixel and the second sub-pixel are different and have relevant variation.

10 Claims, 10 Drawing Sheets

FOREIGN PATENT DOCUMENTS

| | | |
|---|---|---|
| CN | 1821842 | 8/2006 |
| JP | 08179278 | 7/1996 |
| JP | 2000147462 | 5/2000 |
| JP | 2002165185 | 6/2002 |
| JP | 2003105334 | 4/2003 |
| KR | 1020030042221 | 5/2003 |
| TW | I240103 | 9/2005 |
| TW | 200628942 | 8/2006 |
| WO | WO 2004/086129 | 10/2004 |

* cited by examiner

LIQUID CRYSTAL DISPLAY AND DRIVING METHOD THEREOF

This application is a continual application of co-pending application Ser. No. 11/682,003, filed on Mar. 5, 2007, which claims priority to Taiwanese application number 95133352, filed Sep. 8, 2006, both of which are incorporated herein by reference.

BACKGROUND OF THE INVENTION

1. Field of the Invention

The invention relates in general to a liquid crystal display (LCD) and driving method thereof, and more particularly to a liquid crystal display having two driving voltages for each pixel and driving method thereof.

2. Description of the Related Art

Figure 1:
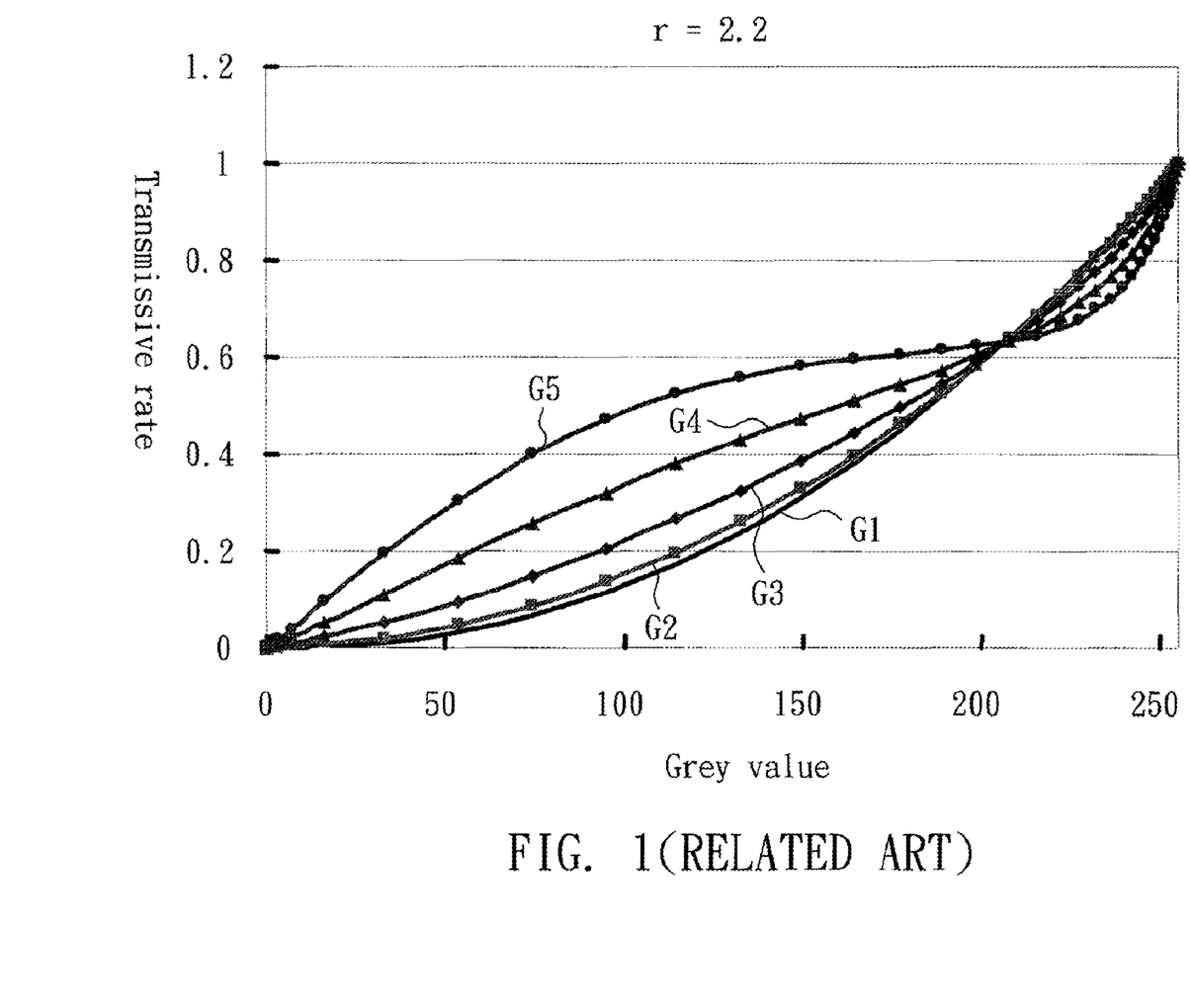
FIG. 1 is gamma curves of a conventional MVA-type liquid crystal display as displayed in several viewing angles.

In a conventional liquid crystal display, each pixel uses only a driving voltage, which easily results in a color-deviation issue as a viewing angle varies. Referring to FIG. 1, gamma curves of a conventional multi-domain vertical alignment (MVA)-type liquid crystal display as displayed in several viewing angles are shown, wherein the gamma coefficient r is 2.2. The curve G1 is a gamma curve of the display observed at a front view, while the curves G2~G5 are respectively gamma curves of the display observed at a viewing angle of 15, 30, 45 and 60 degrees. From FIG. 1, due to difference of the gamma curves at a front view and side view, corresponding to the same grey value, a light transmissive rate of liquid crystals at a front view and side view are also different. Therefore, images may have color variation as displayed at different viewing angles, which is called a color-deviation phenomenon.

SUMMARY OF THE INVENTION

It is therefore an object of the invention to provide a liquid crystal display and driving method thereof. Each pixel includes two sub-pixels and each sub-pixel has a driving voltage. The two sub-pixels have different liquid-crystal tilt angles, and thus optical effect in the two regions can compensate to each other. Besides, variations of the two pixel voltages are relevant. Therefore, the above color-deviation issue can be eliminated and image quality of the liquid crystal display can be improved.

The invention achieves the above-identified object by providing a liquid crystal display including a gate driver, a data driver and a pixel matrix. The gate driver is for outputting a plurality of gate signals successively. The data driver is for providing a plurality of data signals. The pixel matrix includes a number of pixels coupled to the gate driver and the data driver. Each of the pixels includes a first sub-pixel, a second sub-pixel and a voltage coupling device. The first sub-pixel includes a first switch device, a first pixel electrode, a first electrode, a first common electrode, and a first storage capacitor.

The first switch device is for outputting the corresponding data signal according to the corresponding gate signal. The first pixel electrode is coupled to the first switch device for receiving the data signal. The first electrode is for providing a first voltage. The first storage capacitor is formed between the first pixel electrode and the first common electrode. The second sub-pixel includes a second switch device, a second pixel electrode, a second electrode, a second common electrode and a second storage capacitor. The second switch device is for outputting the corresponding data signal according to the corresponding gate signal. The second pixel electrode is coupled to the second switch device for receiving the data signal. The second electrode is for providing a second voltage. The second storage capacitor is formed between the second pixel electrode and the second common electrode. The voltage coupling device is coupled between the first sub-pixel and the second sub-pixel such that the first common electrode is electrically related to the second common electrode.

The invention achieves the above-identified object by providing a method for driving a liquid crystal display. The liquid crystal display includes a gate driver, a data driver and several rows of pixels. The gate driver outputs a number of gate signals, and the data driver outputs a number of data signals. Each of the pixels includes a first sub-pixel and a second sub-pixel. The first sub-pixel has a first switch device, a first pixel electrode, a first common electrode and a first electrode. The first pixel electrode and the first common electrode form a first storage capacitor. The second sub-pixel has a second switch device, a second pixel electrode, a second common electrode and a second electrode. The second pixel electrode and the second common electrode form a second storage capacitor.

The method includes (a) enabling a row of pixels according to the corresponding gate signal to turn on the first switch device and the second switch device of each pixel in the row of pixels, inputting the corresponding data signal to the first pixel electrode and the second pixel electrode and respectively providing a first voltage and a second voltage to the first electrodes and the second electrodes in the row of pixels; and (b) after the gate signal is stopped outputting for a period of time, changing at least one of the first voltage and the second voltage of each pixel in the row of pixels to adjust voltages of the corresponding first pixel electrode and the second pixel electrode such that the voltage of the first pixel electrode is not equal to the voltage of the second pixel electrode, wherein voltage variation $\Delta Vp1$ of the first pixel electrode, voltage variation $\Delta Vp2$ of the second pixel electrode, variation $\Delta V1$ of the first voltage and variation $\Delta V2$ of the second voltage have the following relationship: $\Delta Vp1 = c1 * \Delta V1 + c2 * \Delta V2$; $\Delta Vp2 = c3 * \Delta V1 + c4 * \Delta V2$, and constants $c1$ and $c2$ are not both zero, constants $c3$ and $c4$ are not both zero.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
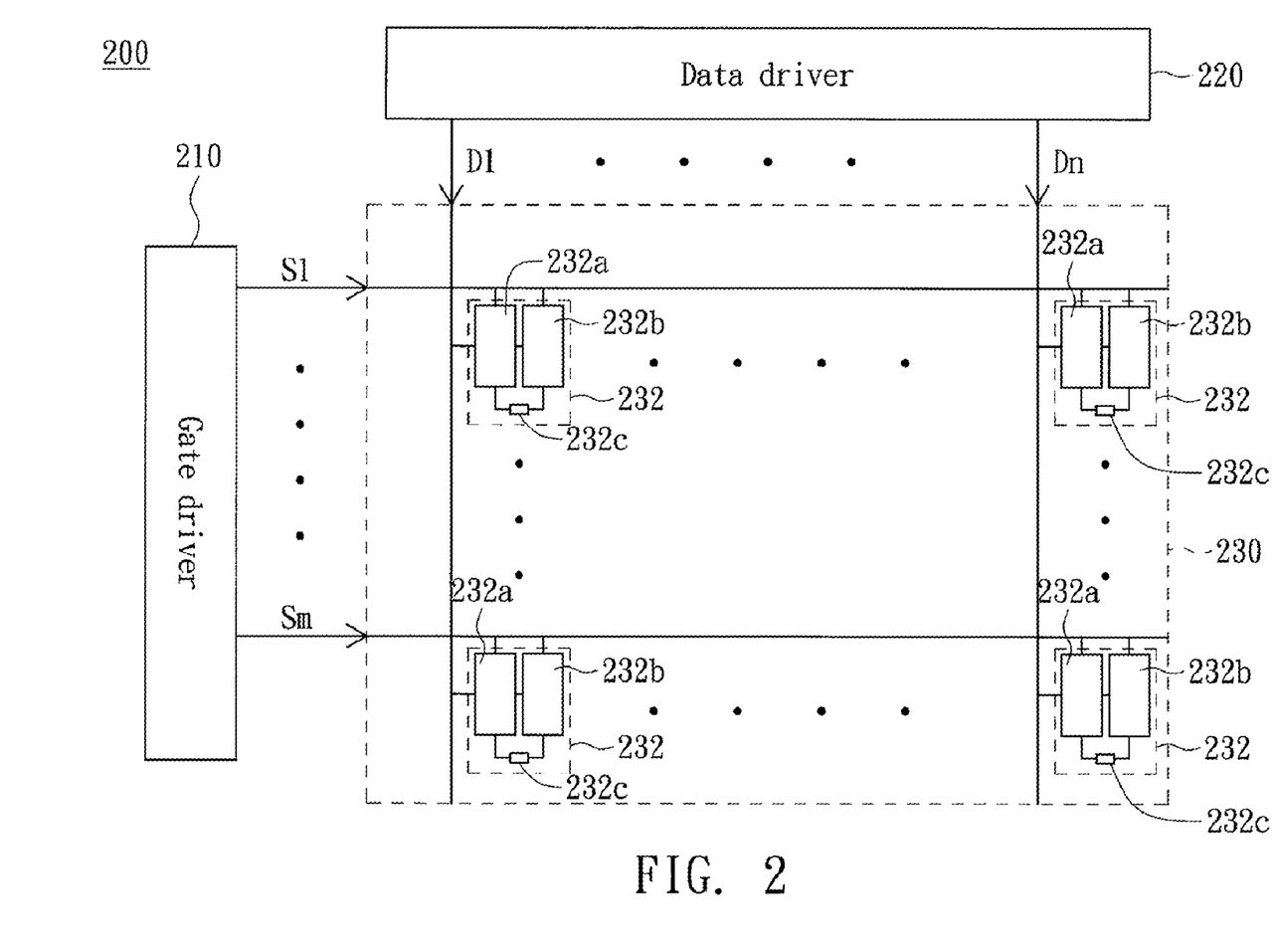
FIG. 2 is a schematic diagram of a liquid crystal display structure according to a preferred embodiment of the invention.

Referring to FIG. 2, a schematic diagram of a liquid crystal display structure according to a preferred embodiment of the invention is shown. A liquid crystal display 200, such as a MVA-type liquid crystal display, includes a gate driver 210, a data driver 220 and a pixel matrix 230. The gate driver 210 is for successively outputting m gate signals S1~Sm to the pixel matrix 230 and the data driver 220 is for providing n data signals D1~Dn to the pixel matrix 230, wherein m and n are positive integers. The pixel matrix 230 includes m*n pixels 232, and each pixel 232 includes a first sub-pixel 232a, a second sub-pixel 232b and a voltage coupling device 232c. The first sub-pixel 232a and the second sub-pixel 232b receive the same data signal Dj (j=1~n) according to the gate signal Si (i=1~m). The voltage coupling device 232c is coupled to the first sub-pixel 232a and the second sub-pixel 232b such that variations of pixel voltages of the first sub-pixel 232a and the second sub-pixel 232b are relevant.

Figure 3:
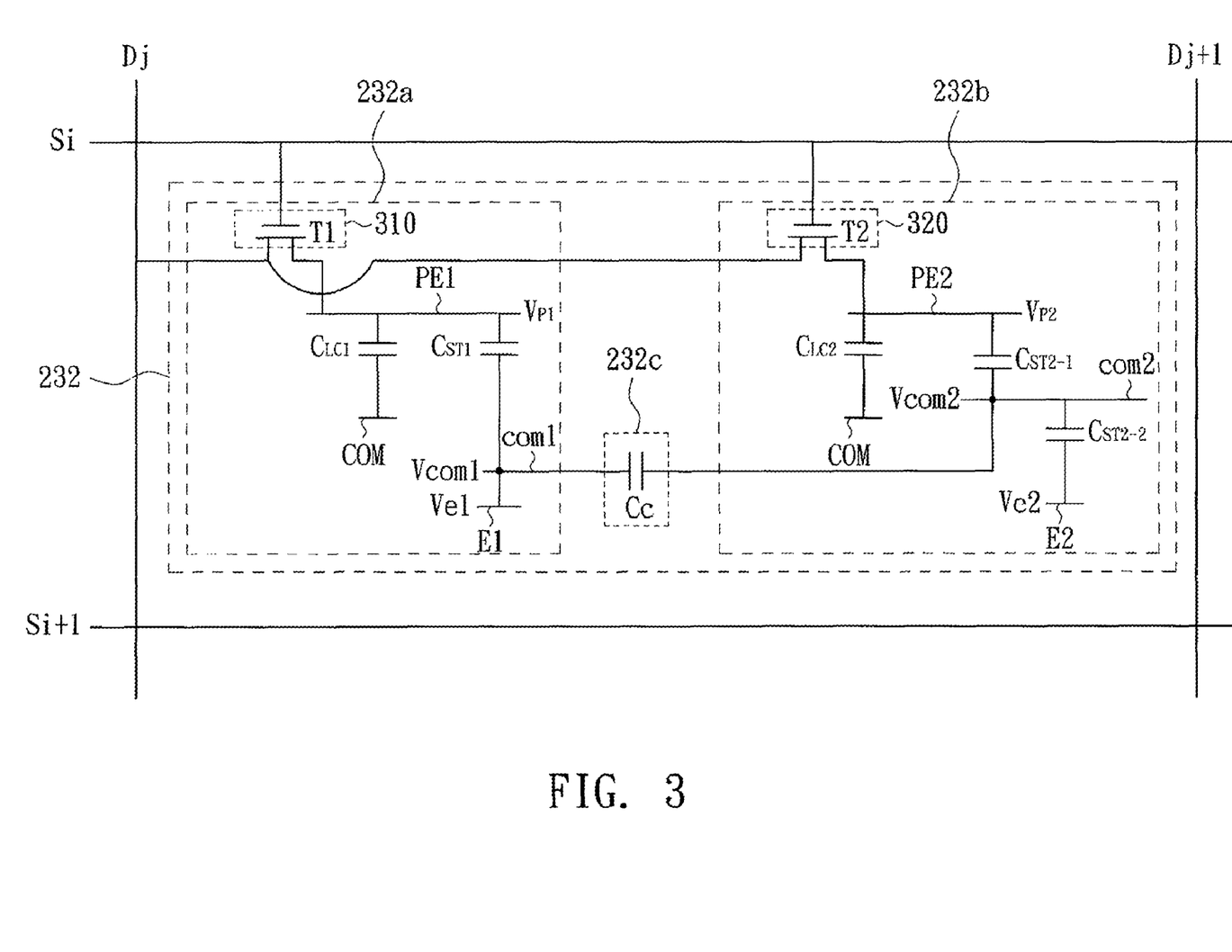
FIG. 3 is a schematic diagram of a circuit structure of the (i, j)-th pixel in FIG. 2.

Referring to FIG. 3, a schematic diagram of a circuit structure of the (i, j)-th pixel 232 in FIG. 2 is shown. As shown in FIG. 3, the first sub-pixel 232a of the (i, j)-th pixel 232 includes a first switch device 310, a first pixel electrode PE1, a first common electrode com1, a first electrode E1, a first liquid crystal capacitor $C_{LC1}$ and a first storage capacitor $C_{ST1}$. The first switch device 310, such as a thin film transistor (TFT) T1, is for outputting the corresponding data signal Dj according to control of the i-th gate signal Si. In the embodiment, the first switch device 310 is exemplified to be an N-type metal oxide semiconductor (NMOS) transistor for illustration. The transistor T1 has a gate for receiving the gate signal Si, a source for receiving the data signal Dj and a drain for outputting the data signal Dj.

The first pixel electrode PE1 is coupled to the drain of the first switch device (transistor T1) for receiving the data signal Dj. A liquid crystal layer (not shown in the figure) is disposed between the first pixel electrode PE1 and a common electrode COM on an upper substrate to form the first liquid crystal capacitor $C_{LC1}$. An insulation layer (not shown in the figure) is disposed between the first pixel electrode PE1 and the first common electrode com1 to form the first storage capacitor $C_{ST1}$. The first electrode E1 is coupled to the first common electrode com1 and the first electrode E1 is for providing a voltage Ve1. For example, the voltage Ve1 has a swing-type waveform and a voltage Vcom1 of the first common electrode com1 has also a swing-type waveform with the same amplitude as the voltage Ve1 of the first electrode E1. Of course, in practical application, the first common-electrode voltage Vcom1 can also be provided directly by the first common electrode com1.

The second sub-pixel 232b includes a second switch device 320, a second pixel electrode PE2, a second common electrode com2, a second electrode E2, a second liquid crystal capacitor $C_{LC2}$, a second storage capacitor $C_{ST2-1}$ and a third storage capacitor $C_{ST2-2}$. The second switch device 320, such as a TFT T2, is for outputting the corresponding data signal Dj according to control of the corresponding i-th gate signal Si. In the embodiment, the second switch device 320 is exemplified to be a NMOS transistor. The transistor T2 has a gate for receiving the gate signal Si, a source for receiving the data signal Dj and a drain for outputting the data signal Dj.

The second pixel electrode PE2 is coupled to a drain of the second switch device (transistor T2) 320 for receiving the data signal Sj. A liquid crystal layer (not shown in the figure) is disposed between the second pixel electrode PE2 and the common electrode COM on the upper substrate to form the second liquid crystal capacitor $C_{LC2}$. An insulation layer (not shown in the figure) is disposed between the second pixel electrode PE2 and the second common electrode com2 to form the second storage capacitor $C_{ST2-1}$. The second common electrode com2, such as a lower substrate, has a second common voltage Vcom2. Another insulation layer (not shown in the figure) is disposed between the second electrode E2 and the second common electrode com2 to form the third storage capacitor CST2-2. The second electrode E2 is for providing a voltage Ve2, such as a constant voltage. The voltage Ve2 can be provided by a gate line near the (i, j)-th pixel 232 to reduce a number of electrodes in transverse and thus increase an opening ratio.

Besides, the voltage coupling device 232c, such as a capacitor Cc, is coupled to the first common voltage com1 and the second common electrode com2 such that variations of the first common-electrode voltage Vcom1 and the second common-electrode voltage Vcom2 are relevant to each other. As mentioned above, the first common-electrode voltage Vcom1 behaves in a swing type and thus the voltage Vcom2 also behaves in a swing type but with smaller amplitude. Due to an effect of the first storage capacitor $C_{ST1}$ and the second storage capacitor $C_{ST2-1}$, the pixel voltage Vp1 of the first pixel electrode E1 and the pixel voltage Vp2 of the second pixel electrode PE2 have relevant variation.

Figure 4:
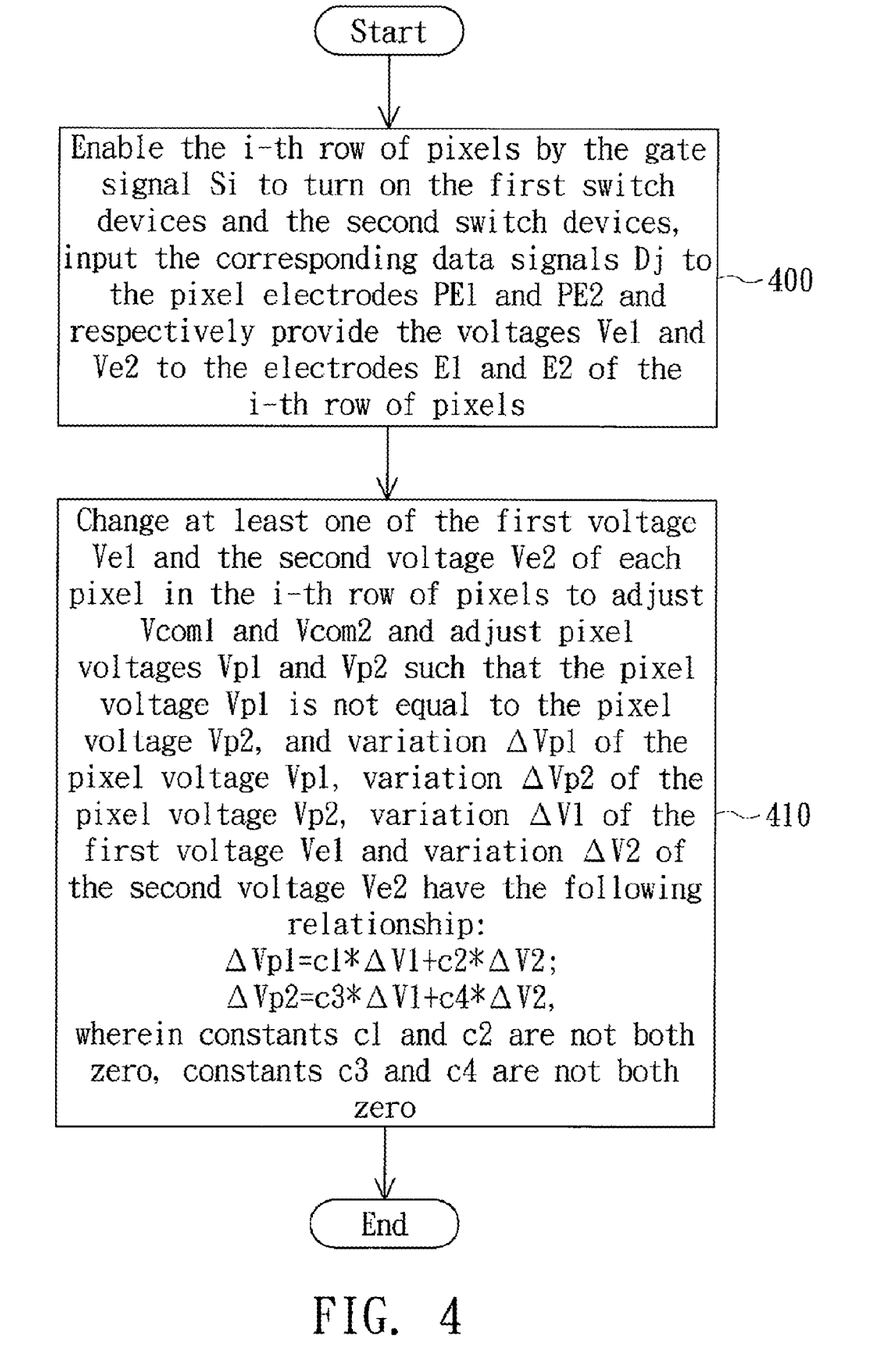
FIG. 4 is a flow chart of a method for driving a liquid crystal display according to a preferred embodiment of the invention.

Referring to FIG. 4, a flow chart of a method for driving a liquid crystal display according to a preferred embodiment of the invention is shown. First, in step 400, in a timing duration t1, enable the i-th row of pixels 232 by the gate signal Si(i=1~m) to turn on the first switch devices 310 and the second switch devices 320 in the i-th row of pixels 232, input the corresponding data signals Dj (j=1~n) to the first pixel electrodes PE1 and second pixel electrode PE2 and respectively provide the first voltage Ve1 and the second voltage Ve2 to the first electrodes E1 and second electrodes E2 of the i-th row of pixels 232.

Afterwards, in step 410, after the gate signal Si is stopped outputting for a period of time t2, in a timing duration t3, change at least one of the first voltage Ve1 and the second voltage Ve2 of each pixel 232 in the i-th row of pixels 232 to adjust the first common-electrode voltage Vcom1 and the second common-electrode voltage Vcom2 and adjust a pixel voltage Vp1 of the corresponding first pixel electrode PE1 and a pixel voltage Vp2 of the corresponding second pixel electrode PE2 such that the pixel voltage Vp1 is not equal to the pixel voltage Vp2, and variation ΔVp1 of the pixel voltage Vp1, variation ΔVp2 of the pixel voltage Vp2, variation ΔV1 of the first voltage Ve1 and variation ΔV2 of the second voltage Ve2 have the following relationship: ΔVp1=c1*ΔV1+ c2*ΔV2; ΔVp2=c3*ΔV1+c4*ΔV2, and constants c1 and c2 are not both zero, constants c3 and c4 are not both zero.

In the embodiment, the first voltage Ve1 or the first common-electrode voltage Vcom1 is altered in a swing type and the second common-electrode voltage Vcom2 is adjusted by an effect of the voltage coupling device 232c (the capacitor Cc) such that variations of the pixel voltages Vp1 and Vp2 are both relevant to variations of the first voltage Ve1 and the second voltage Ve2 and thus variations of the pixel voltages Vp1 and Vp2 are relevant to each other. In the following description, a signal timing diagram is used to illustrate how the pixel voltages Vp1 and Vp2 are changing in accordance with variation of the first voltage Ve1 and the second voltage Ve2.

Figure 5:
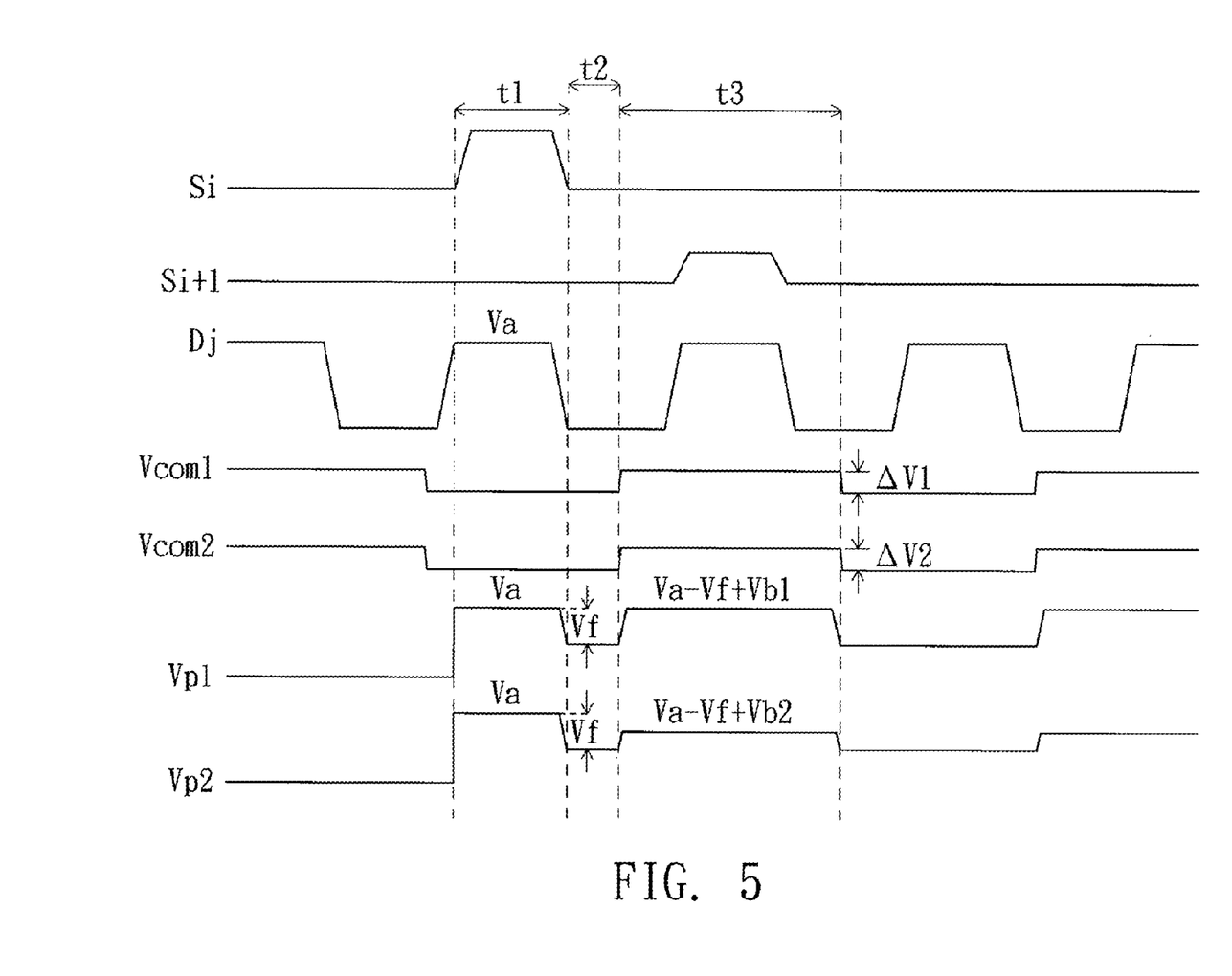
FIG. 5 is a timing diagram of the gate signal Si, data signal Dj, first common-electrode voltage Vcom1, second common-electrode voltage Vcom2, and pixel voltages Vp1 and Vp2 in FIG. 3.

Referring to FIG. 5, a timing diagram of the gate signal Si, data signal Dj, first common-electrode voltage Vcom1, second common-electrode voltage Vcom2, and pixel voltages Vp1 and Vp2 in FIG. 3 is shown, wherein pixels are driven in a positive direction in the embodiment. In the timing duration t1, the gate signal Si with a high voltage level turns on the first switch device 310 of the first sub-pixel 232a and the second switch device 320 of the second sub-pixel 232b and the data signal Dj is transmitted to the first pixel electrode PE1 and the second pixel electrode PE2 respectively via the first switch device 310 and the second switch device 320. The first voltage Ve1 and the second voltage Ve2 both have a low level, that is, the first common-electrode voltage Vcom1 and the second common-electrode voltage Vcom2 are both at a low level. At the time, the pixel voltages Vp1 and Vp2 are approximately equal to the voltage level Va of the data signal Dj. Following that, in the timing duration t2, the first common-electrode voltage Vcom1 and the second common-electrode voltage Vcom2 remain at the low level. The gate signal Si has an output of a low voltage level such that the first switch device 310 and the second switch device 320 are both turned off. At the time, due to an effect of a parasitic capacitor Cgs (not shown in the figure) of the first pixel electrode PE1 and the second pixel electrode PE2, the pixel voltages Vp1 and Vp2 are lowered down by a feed-through voltage Vf from an original value Va.

Afterwards, in the timing duration t3, the first voltage Ve1 or the first common-electrode voltage Vcom1 is increased by a value $\Delta V1$ to a high level. The second voltage Ve2 remains unchanged and due to a coupling effect of the voltage coupling device 232c, the second common-electrode voltage Vcom2 is increased by a value $\Delta V2$ ($<\Delta V1$), wherein $$\Delta V2 = \frac{Cc}{C_{ST2-2} + Cc + C_{ST2-1} // C_{LC2}} \times \Delta V1.$$

Due to the effect of the first storage capacitor $C_{ST1}$ and the second storage capacitor $C_{ST2-1}$, the voltage Vp1 of the first pixel electrode PE1 is increased to $$\left(Va - Vf + \frac{C_{ST1}}{C_{ST1} + C_{LC1}} \times \Delta V1\right) = Va - Vf + Vb1,$$

wherein $$Vb1 = \frac{C_{ST1}}{C_{ST1} + C_{LC1}} \times \Delta V1.$$

The voltage Vp2 of the second pixel electrode PE2 is accordingly increased to $$\left(Va - Vf + \frac{C_{ST2-1}}{C_{ST2-1} + C_{LC2}} \times \Delta V2\right) = Va - Vf + Vb2,$$

wherein $$Vb2 = \frac{C_{ST2-1}}{C_{ST2-1} + C_{LC2}} \times \Delta V2.$$

As corresponding to the variation $\Delta Vp1$ of the above pixel voltage Vp1 which is equal to $c1*\Delta V1+c2*\Delta V2$, the constant $$c1 = \frac{C_{ST1}}{C_{ST1} + C_{LC1}}$$

and c2=0. As corresponding to the variation $\Delta Vp2$ of the above pixel voltage Vp2 which is equal to $c3*\Delta V1+c4*\Delta V2$, the constant c3=0 and $$c4 = \frac{C_{ST2-1}}{C_{ST2-1} + C_{LC2}}.$$

Therefore, in the following timing duration, the pixel voltages Vp1 and Vp2 vary in a swing type in accordance with the first common-electrode voltage Vcom1 and the second common-electrode voltage Vcom2. When the swing period of the first common-electrode voltage Vcom1 is much smaller than a frame time (such as 16.6 ms) of the liquid crystal display 200, that is, a ratio of the swing period of the first common-electrode voltage Vcom1 and the frame time is smaller than 1/10, owing that liquid crystals have a smaller response speed and thus cannot feel a high-low variation of the first common-electrode voltage Vcom1, the voltage felt by the liquid crystals is a root-mean-square value (Vrms) of the common-electrode voltage Vcom1. By adjusting the swing amplitude of the first common-electrode voltage Vcom1, a different root-mean-square value is obtained, that is, the liquid crystals can feel a different voltage drop.

Figure 6A:
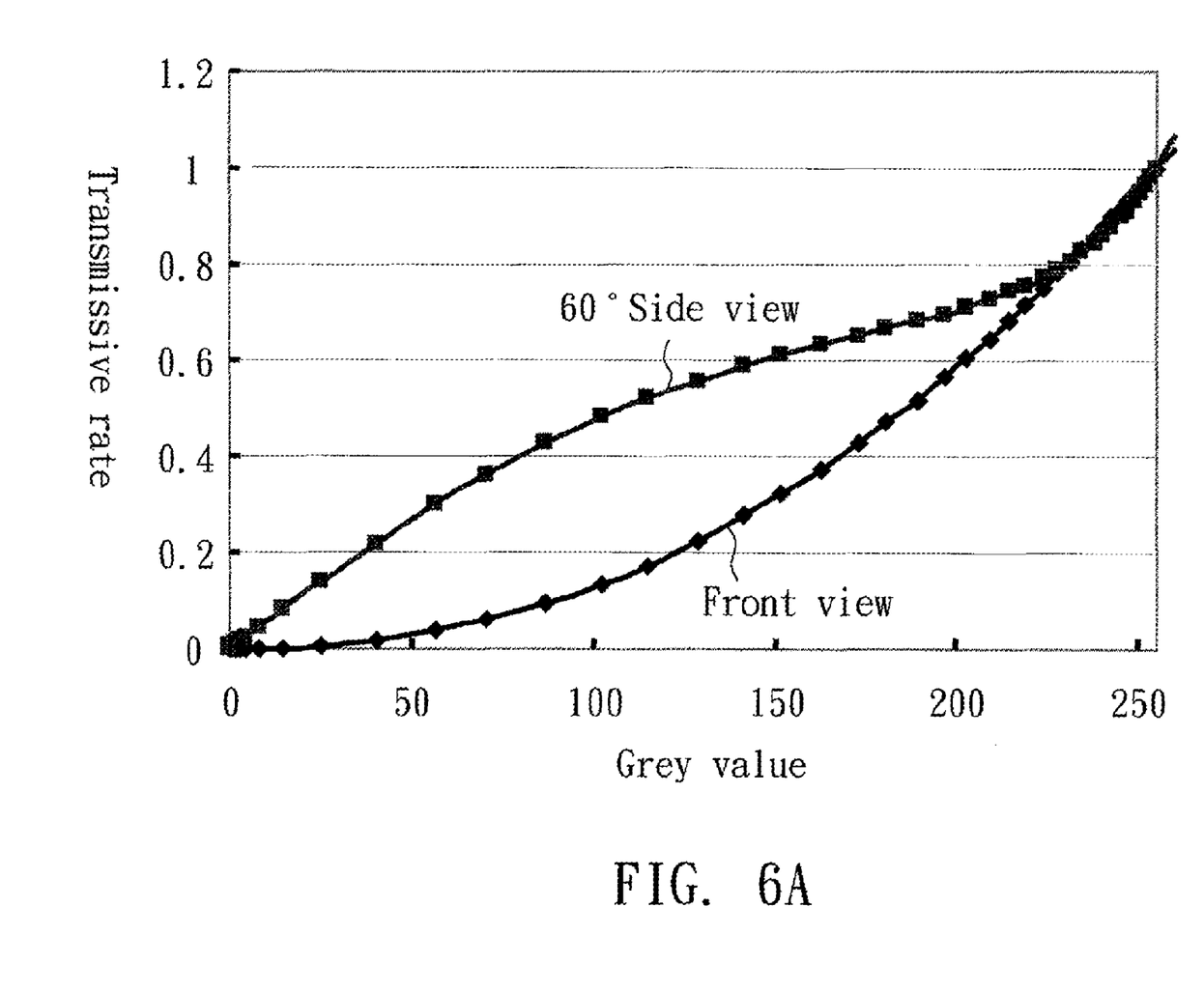
FIG. 6A is gamma curves of a conventional liquid crystal display using only a driving voltage for each pixel as displayed at a front view and 60-degree side view.
Figure 6B:
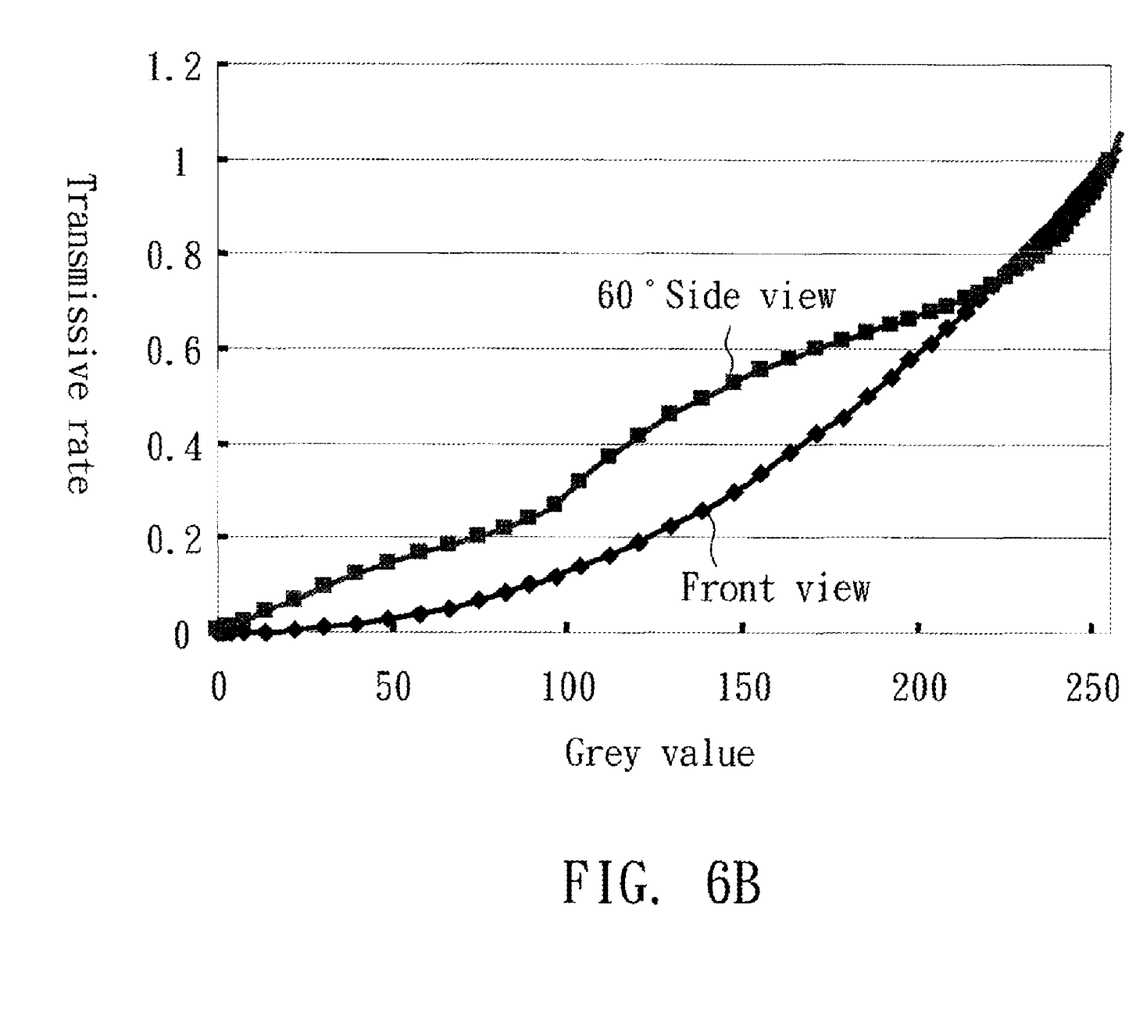
FIG. 6B is gamma curves of the liquid crystal display of the invention using two driving voltages for each pixel 232 as displayed at a front view and 60-degree side view.

According to design of the liquid crystal display 200 in the embodiment, a liquid crystal layer of each pixel 232 can feel two different voltage drops (Vp1-$V_{COM}$) and (Vp2-$V_{COM}$), thereby reducing the above color deviation issue. Referring to FIG. 6A and FIG. 6B, gamma curves of a conventional liquid crystal display using only a driving voltage for each pixel as displayed at a front view and 60-degree side view and gamma curves of the liquid crystal display of the invention using two driving voltages for each pixel 232 as displayed at a front view and 60-degree side view are shown. An operational voltage of the display panel is 5.5V and an area ratio of the first sub-pixel 232a and the second sub-pixel 232b is 4:6. From FIG. 6A and FIG. 6B, it can be seen that by using two different driving voltages for a pixel 232, the invention can effectively reduce the prior-art color deviation issue generated as a viewing angle varies.

Figure 7:
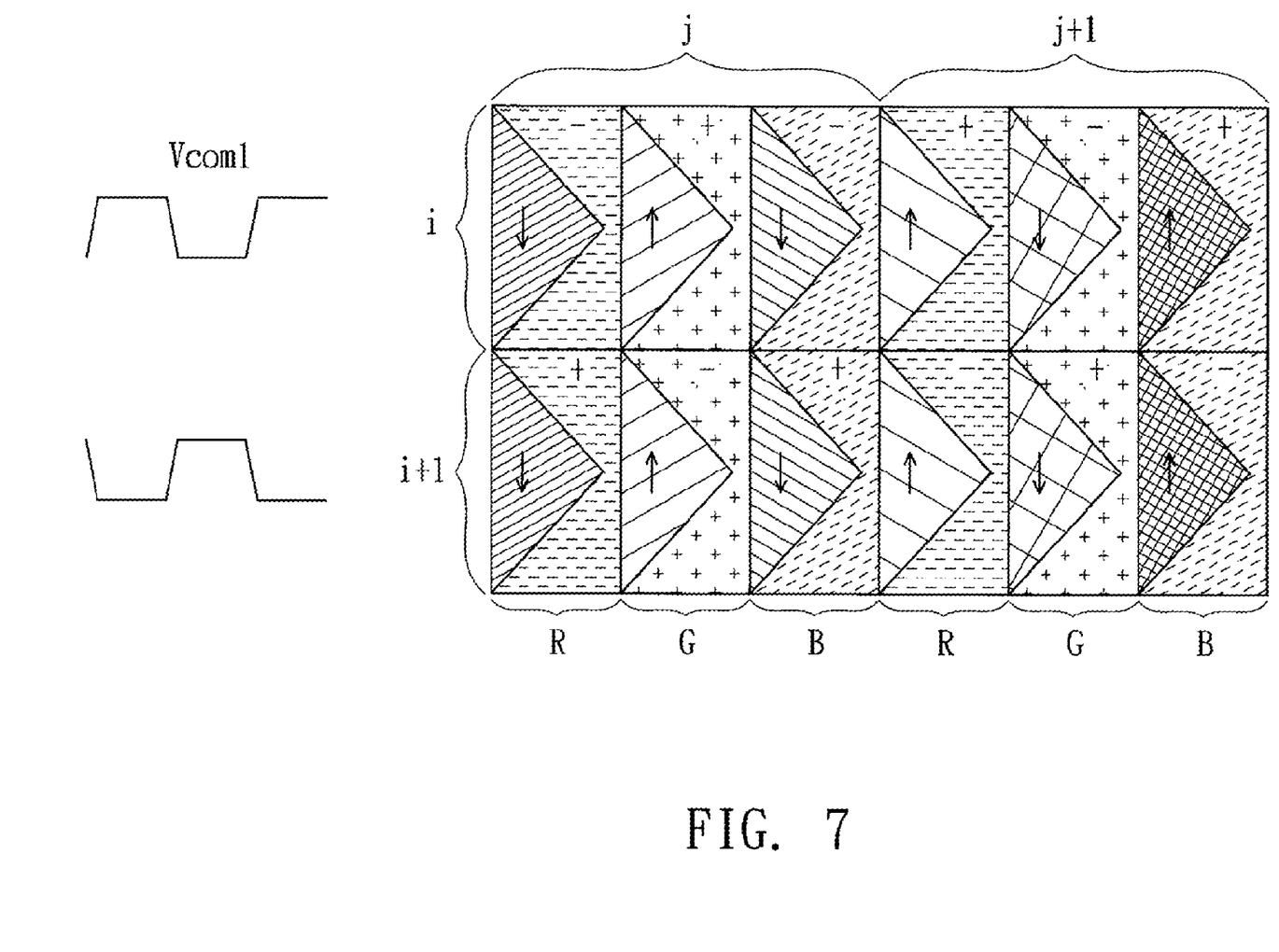
FIG. 7 is a schematic diagram of a panel driving method according to the preferred embodiment of the invention.
Figure 8:
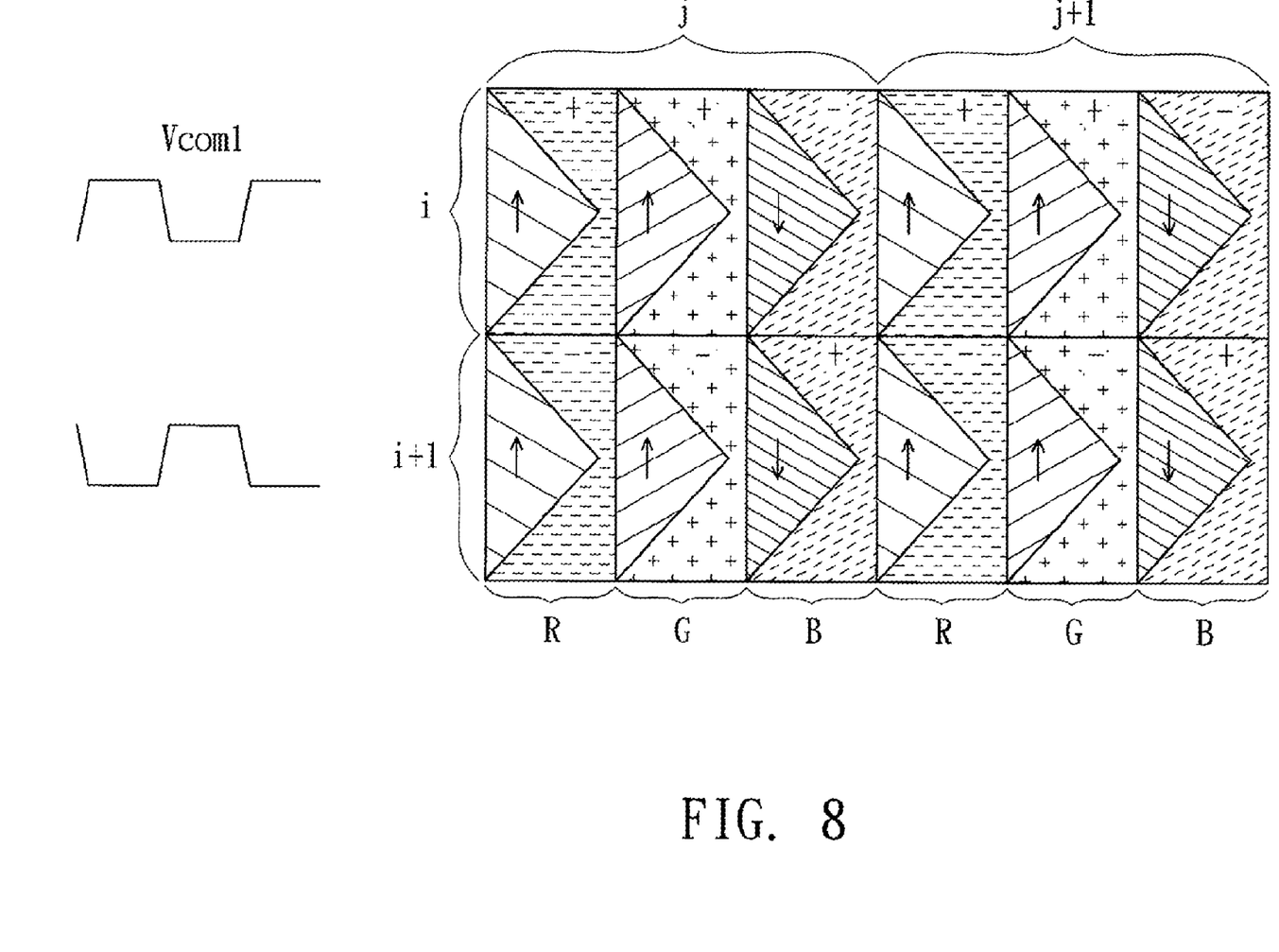
FIG. 8 shows another panel driving method according to the preferred embodiment of the invention.
Figure 9:
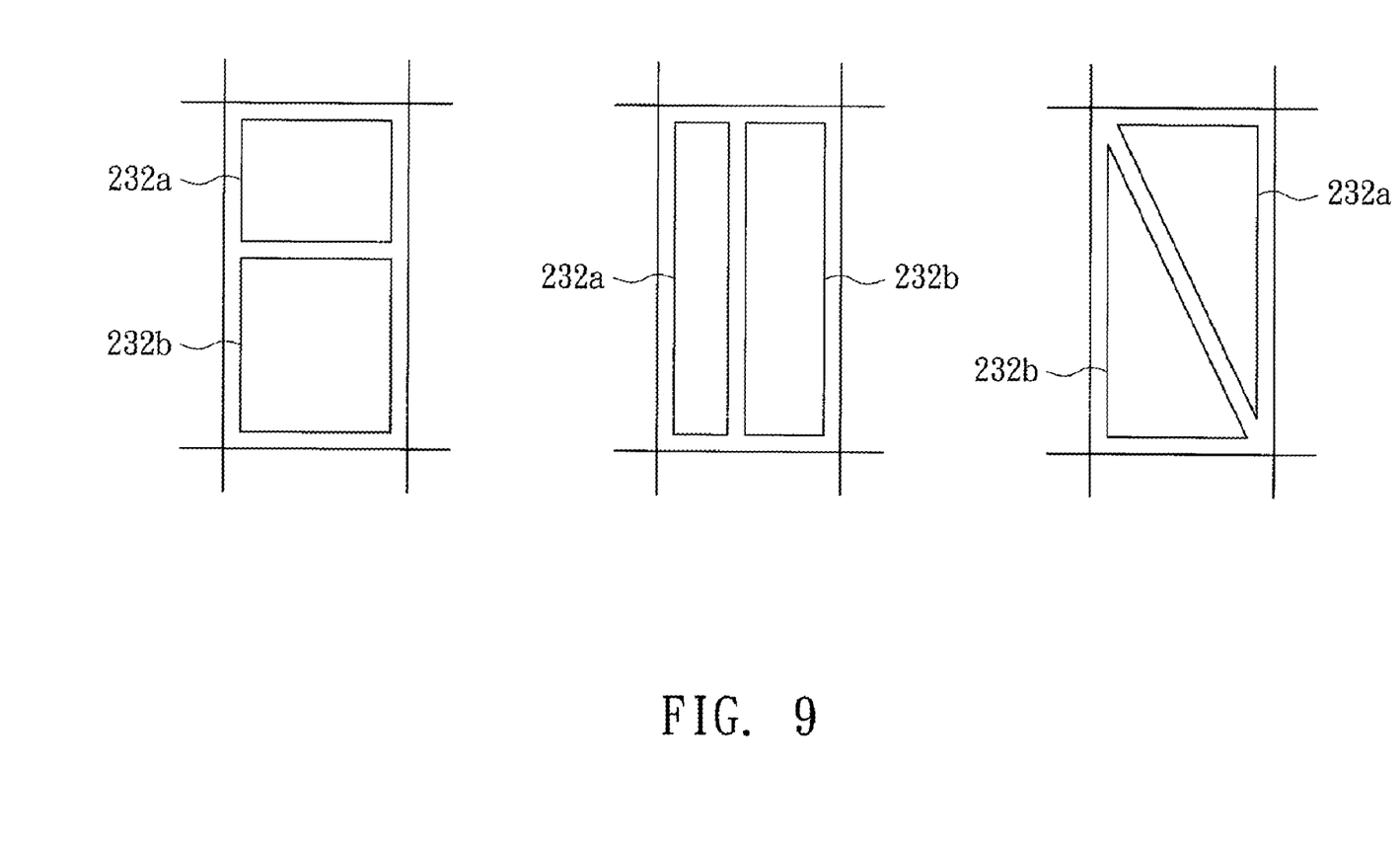
FIG. 9 is a schematic diagram of arrangement patterns of the first sub-pixel and the second sub-pixel according to the preferred embodiment of the invention.

When the liquid crystal display 200 of the invention is driven in a dot-inversion way, the panel can be driven in the following ways. As shown in FIG. 7 and FIG. 8, symbols + and − respectively denote positive and negative polarity of a pixel 232 and symbols ↑ and ↓ respectively denote pixels 232 are driven in positive and negative directions. Different patterns of regions denote different display luminance. The transverse dotted-line, cross-dot and oblique dotted-line regions denote regions of normal luminance, the dense left-oblique-line, dense right-oblique-line and sparse lattice-like regions denote regions of lower luminance, while sparse left-oblique-line regions, sparse right-oblique-line and dense lattice-like regions denote regions of higher luminance.

As shown in FIG. 7, each of the (i, j)-th pixel 232, (i+1, j)-th pixel 232, (i, j+1)-th pixel 232 and (i+1, j+1)-th pixel 232 includes a red pixel R, green pixel G and blue pixel B arranged successively and in the red pixels R, green pixels G and blue pixels B, two adjacent pixels R, G or G, B or B, R or R, R or G, G or B, B have opposite driving polarity. When the gate signal Si is stopped outputting, the first common-electrode voltage Vcom1 is increased from a low level to a high level. Thus, pixels with negative polarity (−) is driven in the negative direction (↓) while pixels with positive polarity (+) is driven in the positive direction (↑). When the gate signal S(j+1) is stopped outputting, the first common-electrode voltage Vcom1 is reduced from a high level to a low level. Thus, pixels with negative polarity (−) is driven in the positive direction (↑) while pixels with positive polarity (+) is driven in the negative direction (↓). Therefore, the adjacent pixels with the same color R, G or B of two adjacent rows of pixels 232 will have the same driving direction, but two adjacent pixels R, G or G, B or B, R in the same row of pixels 232 will have opposite driving direction.

A display result shows that the two adjacent pixels with the same color will have three situations of normal luminance, low luminance and higher luminance. For example, the green pixel G of the (i, j)-th pixel 232 has a region of normal luminance (a cross-dot region) and a region of higher luminance (sparse left-oblique-line region), the green pixel G of the (i, j+1)-th pixel 232 has a region of normal luminance (cross-dot region) and a region of lower luminance (spare lattice-like region). This design (with three kinds of luminance) can reduce the above color-deviation issue.

FIG. 8 shows another panel driving method according to the preferred embodiment of the invention. The polarity of the i-th row of pixels 232 is periodically altered in the order of +, +, −, and the polarity of the (i+1)-th row of pixel 232 is periodically altered in the order of −, −, +. Analyzing according to the above principle, the pixels R, G, B of the i-th row of pixels 232 and the (i+1)-th pixel 232 are periodically driven in the directions of ↑, ↑, ↓, and the two adjacent pixels with the same color R, G, or B has the same luminance, which will not reduce resolution.

Of course, the invention is not limited to the above two panel driving methods, as long as the driving method can provide the pixel voltages Vp1 and Vp2 for driving liquid crystals according to the first common-electrode voltage Vcom1 or the second common-electrode voltage Vcom2 such that variations of the pixel voltages Vp1 and Vp2 are relevant to each other to achieve the purpose of eliminating the color-deviation issue, it will not depart from the scope of the invention.

As mentioned above, although the voltage coupling device 232c of the liquid crystal display 200 in the invention is exemplified to be the capacitor Cc and coupled to the first common electrode com1 and the second common electrode com2, each pixel 232 of the invention can also use any other voltage coupling device 232c such as a resistor and the voltage coupling device 232c can also be coupled to the first pixel electrode PE1 and the second common electrode com2, or coupled to the first pixel electrode PE1 and the second pixel electrode PE2. As long as each pixel 232 has the voltage coupling device 232c coupled to the first sub-pixel 232a and the second sub-pixel 232b such that the pixel voltages Vp1 and Vp2 can be provided for driving liquid crystals according to the first voltage Ve1 or the second voltage Ve2 and variations of the pixel voltages Vp1 and Vp2 are relevant to each other to achieve the purpose of eliminating the color deviation issue, all these will not depart from the scope of the invention.

Besides, although the second common-electrode voltage Vcom2 and the pixel voltages Vp1 and Vp2 are exemplified to be adjusted by changing the first voltage Ve1, the liquid crystal display 200 of the invention can also adjust the pixel voltages Vp1 and Vp2 by changing the second voltage Ve2, or the first voltage Ve1 and second voltage Ve2 simultaneously. For example, the first voltage Ve1 and second voltage Ve2 can be adjusted in a swing-type waveform and the first voltage Ve1 has a swing direction opposite to the second voltage Ve2. As long as the pixel 232 can have two different pixel voltages Vp1 and Vp2 through a voltage-coupling effect and variations of the pixel voltages Vp1 and Vp2 are relevant to each other, all the alternatives are not apart from the scope of the invention.

Moreover, except for the aligning type and manner as shown in FIG. 7 and FIG. 8, the first sub-pixel 232a and the second sub-pixel 232b of each pixel 232 can also be arranged in patterns of square, rectangle, triangle or zigzag. An area ratio of the first sub-pixel 232a and the second sub-pixel 232b is about ⅑~9. Of course, each pixel 232 can also include three or more than three sub-pixels. The liquid crystal display 200 of the invention can also be a MVA-type or TN-type transmissive liquid crystal display or MVA-type or TN-type transflective liquid crystal display.

In the liquid crystal display and driving method thereof disclosed by the above embodiment of the invention, two different pixel voltages are provided for each pixel by adjusting the voltage of a common electrode and variations of the two pixel voltages are relevant to each other due to a coupling effect of the voltage coupling device. Therefore, the prior-art color deviation issue can be solved to improve image quality of the liquid crystal display.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD), comprising:
a gate driver, for outputting a plurality of gate signals successively;
a data driver, for providing a plurality of data signals; and
a pixel matrix, comprising a plurality of pixels coupled to the gate driver and the data driver, wherein each of the pixels receives a corresponding data signal according to a corresponding gate signal and each of the pixels comprises:
a first sub-pixel, comprising:
a first switch device, for outputting the corresponding data signal according to the corresponding gate signal;
a first pixel electrode, coupled to the first switch device for receiving the data signal;
a first electrode, for providing a first voltage;
a first common electrode; and
a first storage capacitor, formed between the first pixel electrode and the first common electrode;

a second sub-pixel, comprising:
- a second switch device, for outputting the corresponding data signal according to the corresponding gate signal;
- a second pixel electrode, coupled to the second switch device for receiving the data signal;
- a second electrode, for providing a second voltage;
- a second common electrode;
- a second storage capacitor, formed between the second pixel electrode and the second common electrode; and
- a third storage capacitor, formed between the second common electrode and the second electrode; and a voltage coupling device, directly coupled to the first common electrode and the second common electrode such that the first common electrode is electrically related to the second common electrode.

2. The liquid crystal display according to claim 1, wherein the first switch device and the second switch device are thin film transistors (TFT).

3. The liquid crystal display according to claim 1, wherein the first voltage has a swing waveform.

4. The liquid crystal display according to claim 1, wherein the first electrodes and the second electrodes are both electrodes disposed on a lower substrate.

5. The liquid crystal display according to claim 1, wherein the gate driver outputs the gate signals via a plurality of gate lines, and the second electrode corresponding to each pixel is one of the gate lines close to the gate line coupled to the first switch device and the second switch device of the corresponding pixel.

6. The liquid crystal display according to claim 1, wherein the voltage coupling device is a capacitor.

7. The liquid crystal display according to claim 1, wherein the voltage coupling device is a resistor.

8. The liquid crystal display according to claim 1, wherein the first sub-pixels or the second sub-pixels have a pattern of square, rectangle, zigzag or triangle.

9. The liquid crystal display according to claim 1, wherein each of the pixels comprises exactly the first sub-pixel and the second sub-pixel, the first sub-pixel has an area not larger than the second sub-pixel and an area ratio of the first sub-pixel and the second sub-pixel is about $1/9 \sim 1$.

10. The liquid crystal display according to claim 1, is selected from a group of a multi-domain vertical alignment (MVA) or twisted nematic (TN) transmissive liquid crystal display or a MVA or TN transflective liquid crystal display.

* * * * *